(12) United States Patent
Lin

(10) Patent No.: US 6,558,057 B2
(45) Date of Patent: May 6, 2003

(54) KEYBOARD HAVING A PROTECTIVE LID

(75) Inventor: Winky Lin, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/897,486

(22) Filed: Jul. 3, 2001

(65) Prior Publication Data

US 2003/0007824 A1 Jan. 9, 2003

(51) Int. Cl.[7] .............................................. B41J 29/13
(52) U.S. Cl. ....................... 400/691; 400/714; 361/680; 312/208.3
(58) Field of Search .............................. 400/713, 714, 400/679, 680, 681, 682, 685, 691, 693; 235/145 A, 145 R, 146; 206/305; D14/392, 394; 361/680, 683; 312/208.1, 208.3, 208.4, 223.2

(56) References Cited

U.S. PATENT DOCUMENTS

| | | | |
|---|---|---|---|
| 5,251,102 A | * | 10/1993 | Kimble .................... 361/680 |
| 5,646,818 A | * | 7/1997 | Hahn ..................... 248/917 |
| 5,975,780 A | * | 11/1999 | Fukami ................... 400/691 |
| 6,108,200 A | * | 8/2000 | Fullerton ................ 235/145 R |
| 6,144,551 A | * | 11/2000 | Kao ...................... 345/905 |
| 6,154,359 A | * | 11/2000 | Kamikakai et al. ........... 16/342 |
| 6,249,431 B1 | * | 6/2001 | Chan ..................... 312/332.1 |
| 6,404,622 B1 | * | 6/2002 | Chen ..................... 248/917 |

FOREIGN PATENT DOCUMENTS

| | | | |
|---|---|---|---|
| JP | 05289773 A | * | 11/1993 |
| JP | 2001318754 | * | 11/2001 |
| TW | 219170 | | 10/1993 |
| TW | 313283 | | 2/1997 |

* cited by examiner

Primary Examiner—Andrew H. Hirshfeld
Assistant Examiner—Jill E Culler
(74) Attorney, Agent, or Firm—Rabin & Berdo, P.C.

(57) ABSTRACT

A keyboard having a protective lid comprises a keyboard body, a linkage board and a lid. The keyboard body has an accommodation space on rear side thereof and the accommodation space has two pivotal holes on two lateral sides thereof. The linkage board has a front end pivotally connected to the keyboard body. The linkage board has a rear end pivotally connected to a front end of the lid such that the lid can be swung to a backside of the keyboard body and functioned as a mount of the keyboard body and the keyboard body is inclined to a specific angle.

10 Claims, 10 Drawing Sheets

KEYBOARD HAVING A PROTECTIVE LID

FIELD OF THE INVENTION

The present invention relates to a keyboard having a protective lid, especially to a keyboard, which has the functions of dust-proofing, protection, support and keyboard mounting.

BACKGROUND OF THE INVENTION

The prior art keyboard having a protective lid has only functions of dust-proof and protection. For example, the keyboard having a protective lid disclosed in Taiwan Patent Publication No. 219170 and No. 313283 has only functions of dust-proof and protection; and does not provide supporting function and occupies considerable space.

As shown in FIGS. 1 and 2, another prior art keyboard having a protective lid disclosed in U.S. Pat. No. 6,108,200 has a socket 65 on rear side of a keyboard 60 and electrically connected to the internal circuit of the keyboard 60. A portable electronic device 4 such as a mobile phone or a PDA (personal digital assistant) is inserted into the socket 65. The keyboard 60 has a sliding supporting stage 70 on rear bottom side thereof. The supporting stage 70 has an unfoldable lid 75.

However, in above-mentioned keyboard having a protective lid, the lid 75 cannot be used as a keyboard mounting to let the keyboard 60 be inclined with specific angle. The whole height of the keyboard 60 will be increased thereby.

SUMMARY OF THE INVENTION

It is the object of the present invention to provide a keyboard having a protective lid, which has the functions of dust-proofing, protection, support and keyboard mounting.

To achieve above object, the present invention provides keyboard having a protective lid having a keyboard body, a linkage board and a lid. The keyboard body has an accommodation space on rear side thereof and the accommodation space has two pivotal holes on two lateral sides thereof. The linkage board has a front end pivotally connected to the keyboard body. The linkage board has a rear end pivotally connected to a front end of the lid such that the lid can be swung to a backside of the keyboard body and functioned as a mount of the keyboard body to let the keyboard body be inclined to a specific angle.

The various objects and advantages of the present invention will be more readily understood from the following detailed description when read in conjunction with the appended drawing, in which:

DETAILED DESCRIPTION OF THE INVENTION

Figure 1:
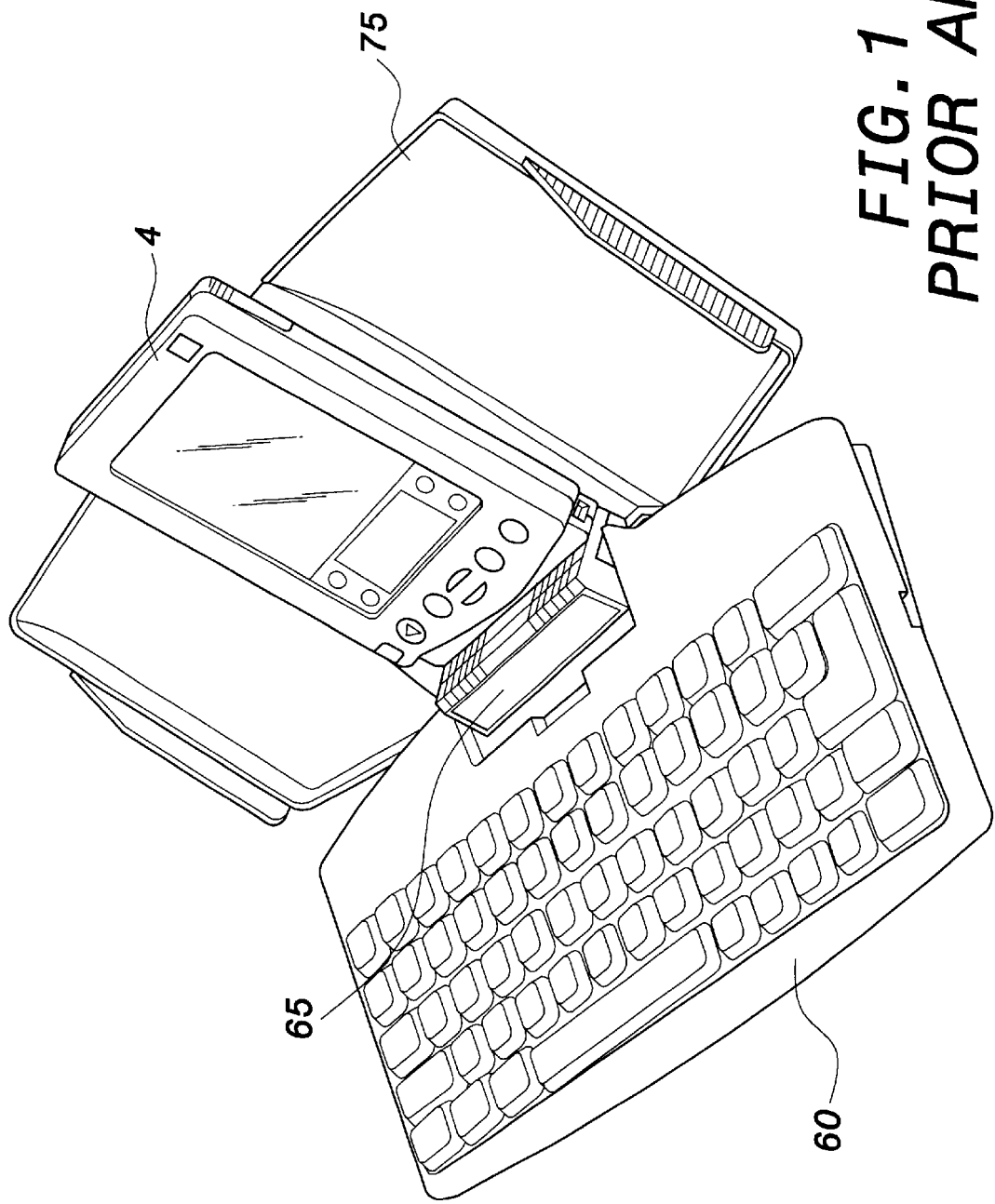
FIG. 1 shows the perspective view of prior art keyboard having a protective lid.
Figure 2:
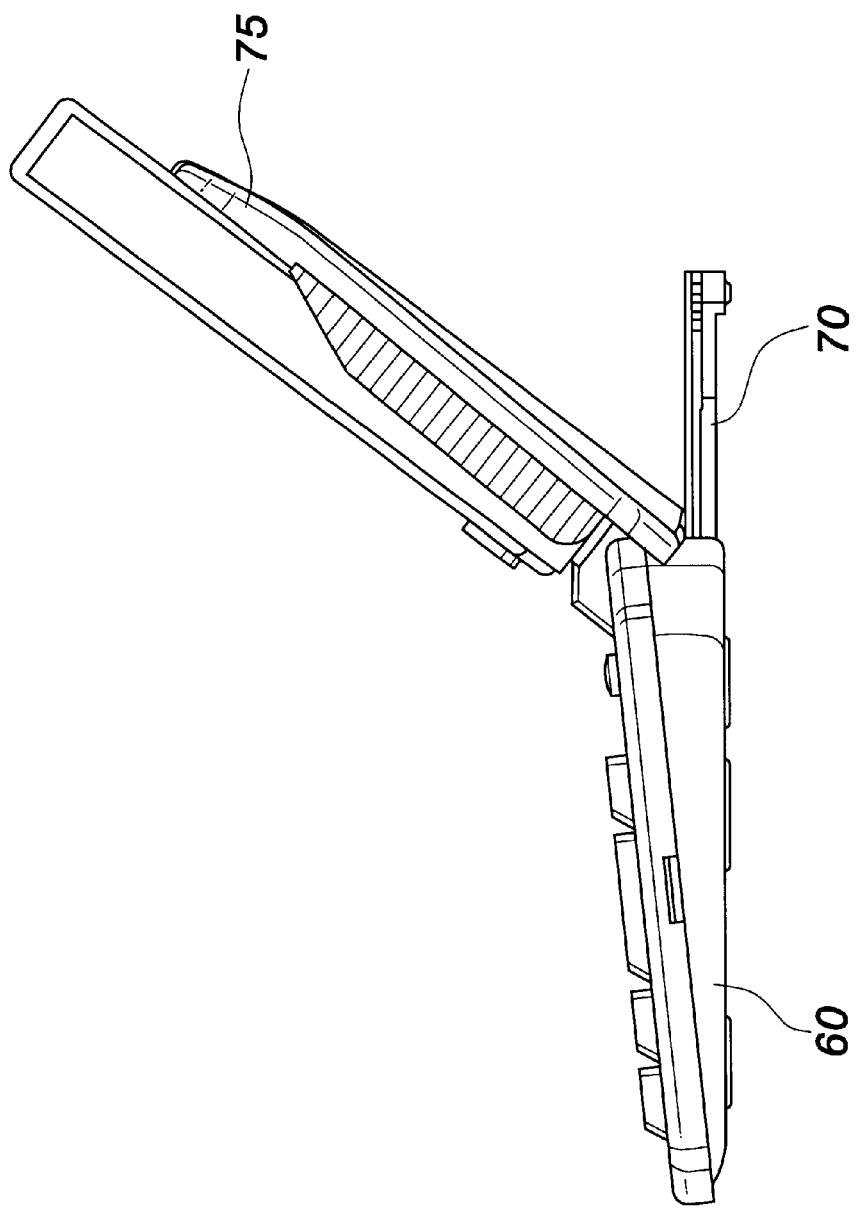
FIG. 2 shows the sectional view of prior art keyboard having a protective lid.
Figure 3:
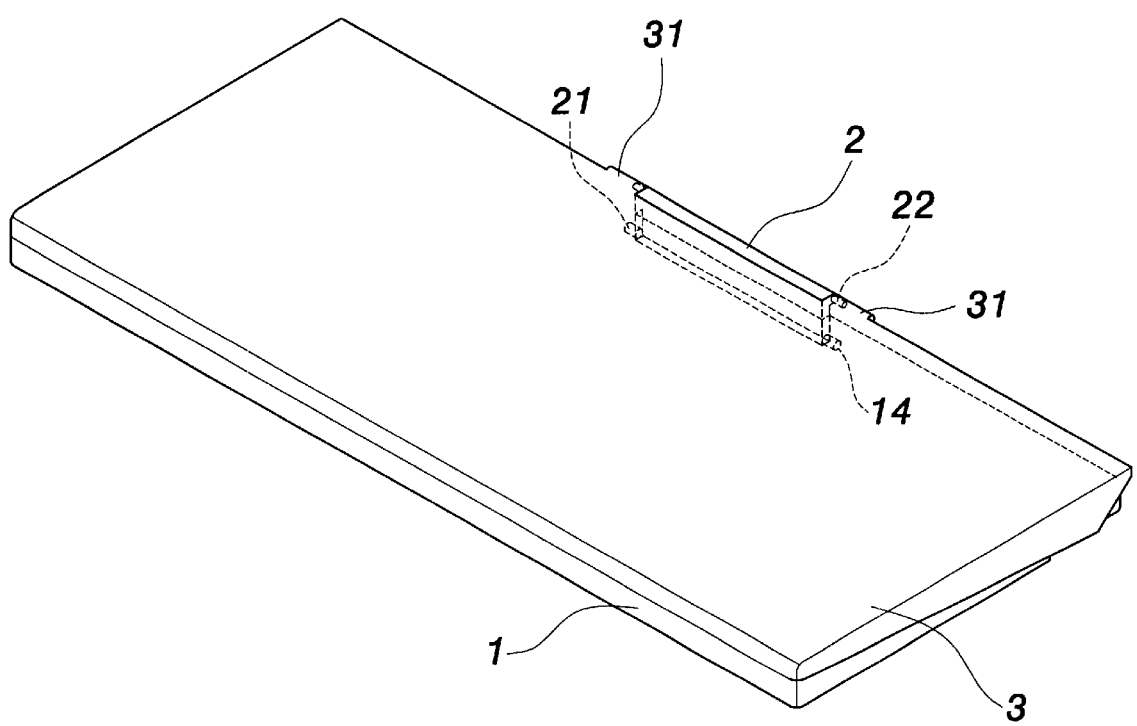
FIG. 3 shows the perspective view of the keyboard having a protective lid of the present invention.
Figure 4:
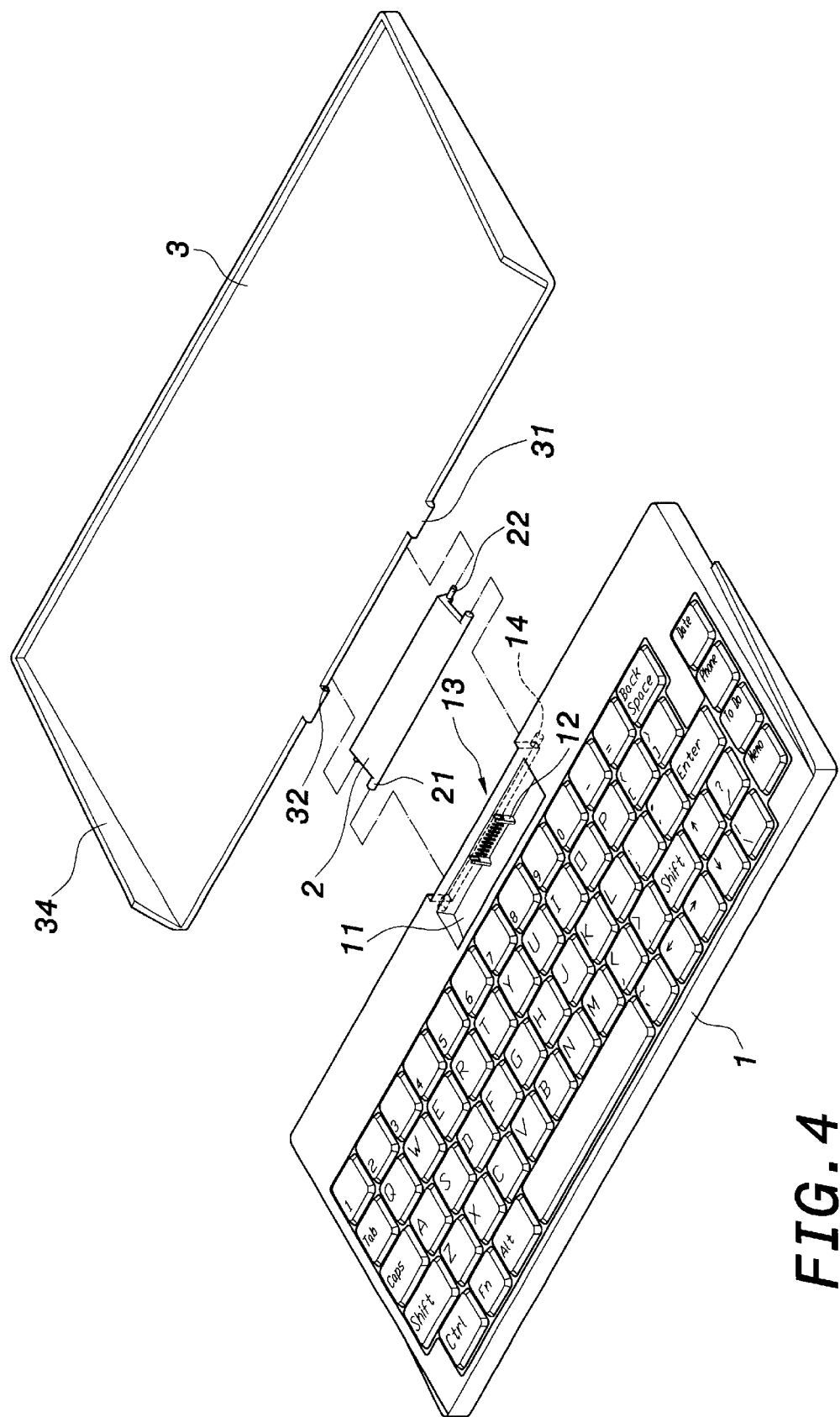
FIG. 4 shows the exploded view of the keyboard having a protective lid of the present invention.

With reference now to FIGS. 3 and 4, the present invention provides a keyboard having a protective lid and the preferred embodiment of the present invention comprises a keyboard body 1, a linkage board 2 and a lid 3.

Figure 7:
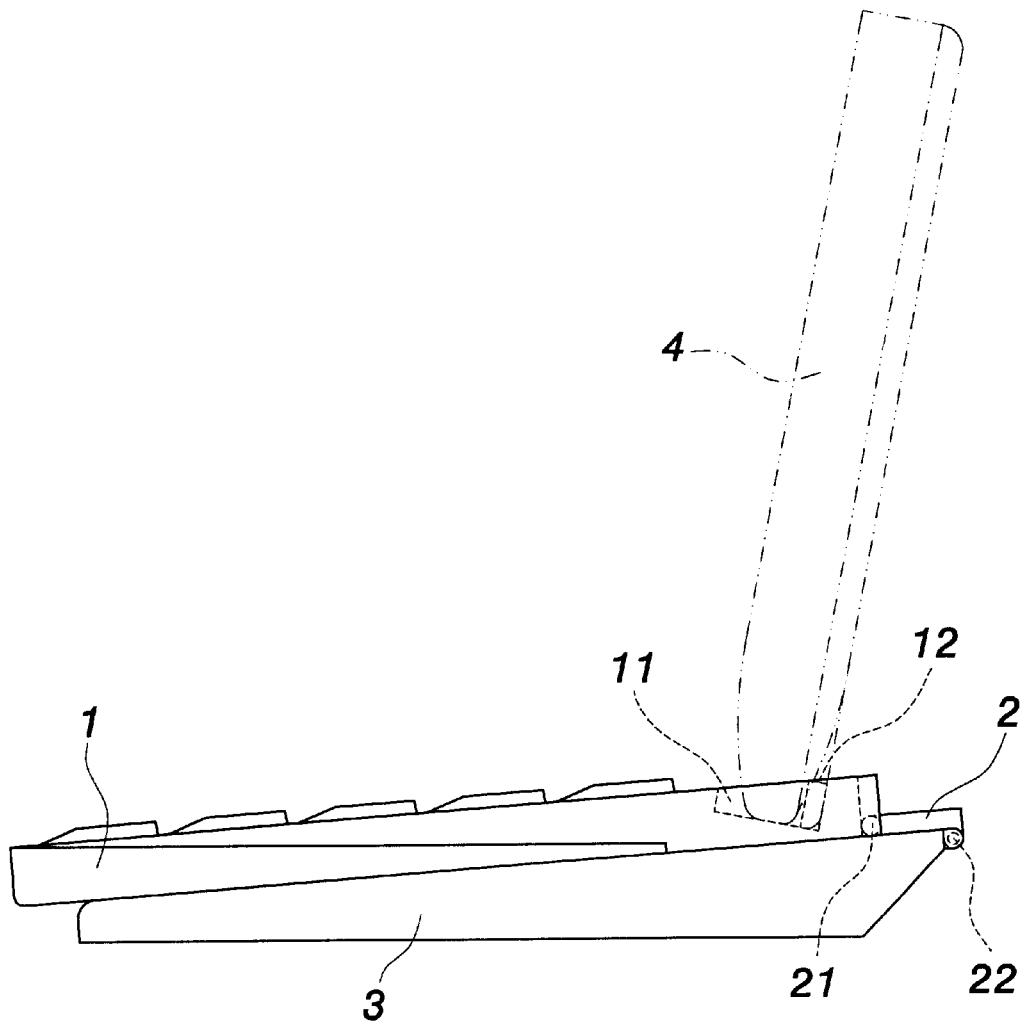
FIG. 7 shows the sectional view of the protective lid of the a preferred embodiment of the invention used as a keyboard mounting.
Figure 10:
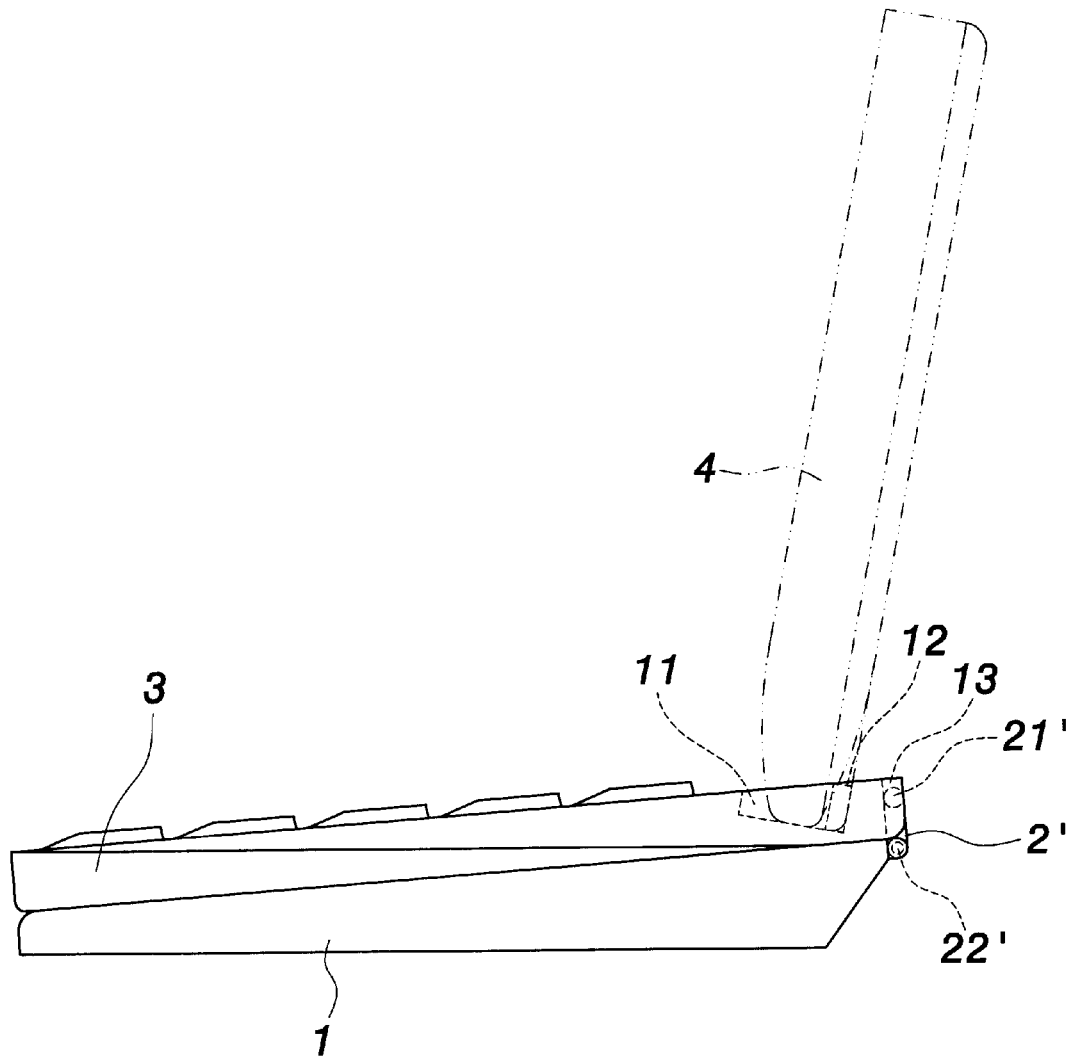
FIG. 10 shows the sectional view of the protective lid of the another preferred embodiment of the invention used as a keyboard mounting.

The keyboard body 1 has a receiving space 11 on a rear side thereof and the receiving space 11 has a socket 12 electrically connected to the internal circuit of the keyboard body 1 and a portable electronic device 4 (as shown in FIGS. 7 and 10) such as a mobile phone or a PDA (personal digital assistant) is inserted into the socket 12. The keyboard body 1 has an accommodation space 13 on the rear side thereof and adjacent to the receiving space 11. The accommodation space 13 has two pivotal holes 14 on two lateral sides thereof.

The linkage board 2 is a plate having an L-shape and has two front pivotal shafts 21 on a front side thereof and pivotally connected to the pivotal holes 14 of the accommodation space 13. Therefore, the linkage board 2 is pivotally assembled to the accommodation space 13. Moreover, the linkage board 2 has two rear pivotal shafts 22 on a rear side thereof and assembled to the lid 3.

The lid 3 has two retaining posts 31 on a front side thereof and corresponding to the two rear pivotal shafts 22 of the linkage board 2. Each retaining post 31 has a retaining hole 32 in which the rear pivotal shaft 22 is pivotally engaged. There is a tapered wall 34 formed on each lateral side of the lid 3. When the lid 3 is at a first position (as shown in FIG. 3), the tapered wall 34 sits on the top surface of the keyboard board 1 so as to cover the keyboard board 1. When the lid 3 is pivoted to a second position (as shown in FIGS. 7 and 10), since the tapered wall 34 of the lid 3 is inclined at an angle, the keyboard body I sits on the bottom surface of the lid 3 such that the rear side of the keyboard body us raised higher than the front side of the keyboard body 1. FIG. 4, the lid 3 can be swung around the two rear pivotal shafts 22 of the linkage board 2 to bottom of the keyboard body 1 and used as keyboard mounting.

Figure 5:
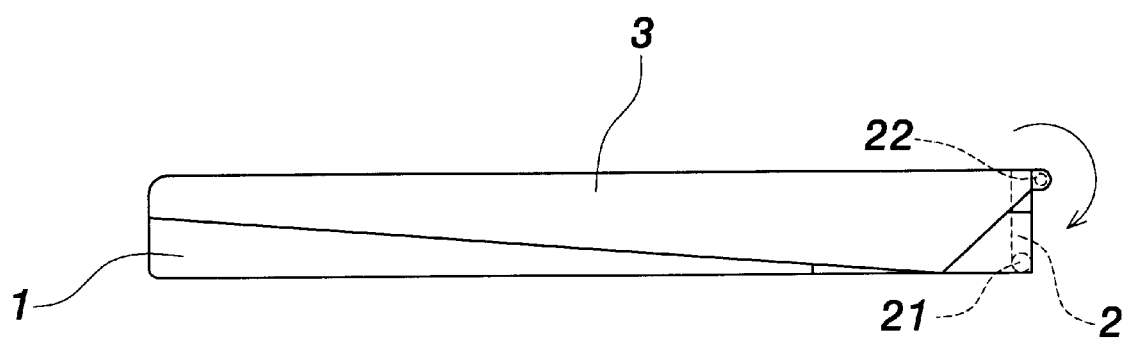
FIG. 5 shows the sectional view of the inventive keyboard having a protective lid in a closed state.
Figure 6:
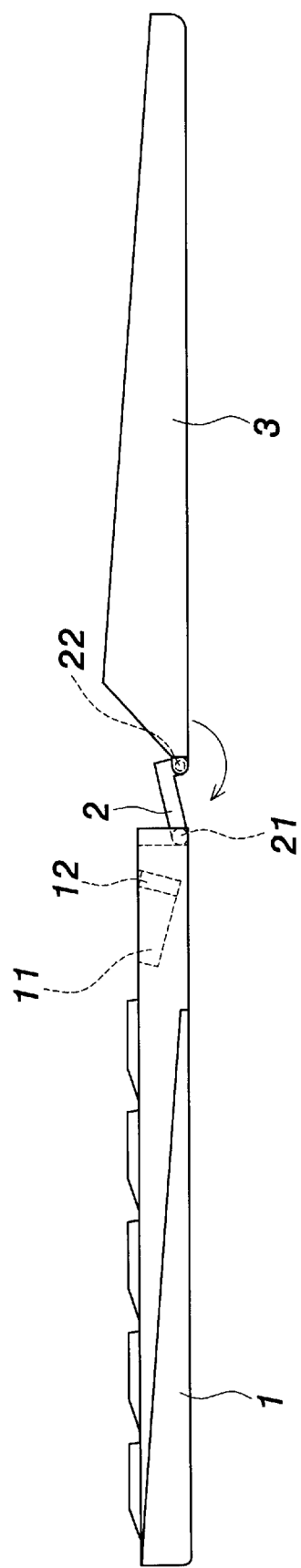
FIG. 6 shows the sectional view of the protective lid of the a preferred embodiment of the invention in an unfolded state.

As shown in FIGS. 5 and 6, the lid 3 is opened with the two front pivotal shafts 21 and the two pivotal holes 14, and with the two rear pivotal shafts 22 and the retaining holes 32. Therefore, the lid 3 is swung from closed state to unfolded state placed below the keyboard body 1, as shown in FIG. 7. The lid 3 can be used, as keyboard mounting to let the keyboard body 1 be inclined to an angle for comfortable operation.

Figure 8:
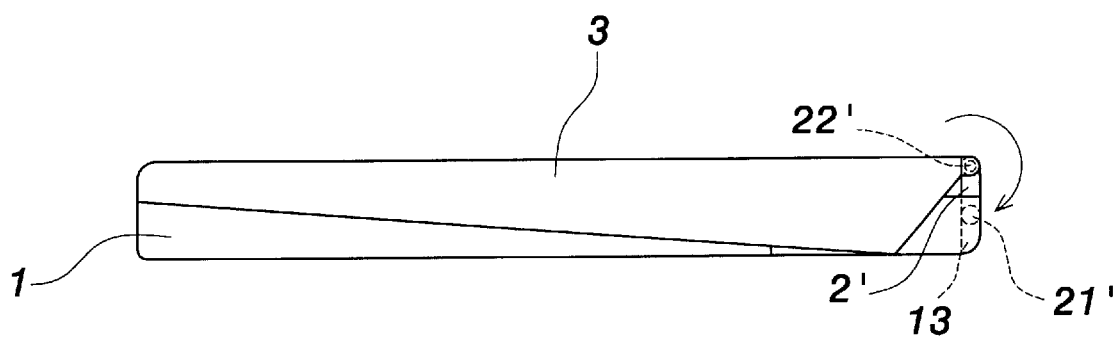
FIG. 8 shows the sectional view of the protective lid of another preferred embodiment of the invention in a closed state.

FIG. 8 shows another preferred embodiment of the present invention. The two pivotal holes 14 are arranged on two center portions of lateral sides of the accommodation space 13 and are pivotally connected to two front pivotal shafts 21' of an I-shaped linkage board 2' such that the linkage board 2' can be swung around the two front pivotal shafts 21' thereof. The I-shaped linkage board 2' has two rear pivotal shafts 22' on rear bottom side thereof and assembled to the retaining holes 32 of the lid 3. Therefore, the lid 3 can be swung around two rear pivotal shafts 22' of the linkage board 2' to bottom of the keyboard body 1 and used as keyboard mounting.

Figure 9:
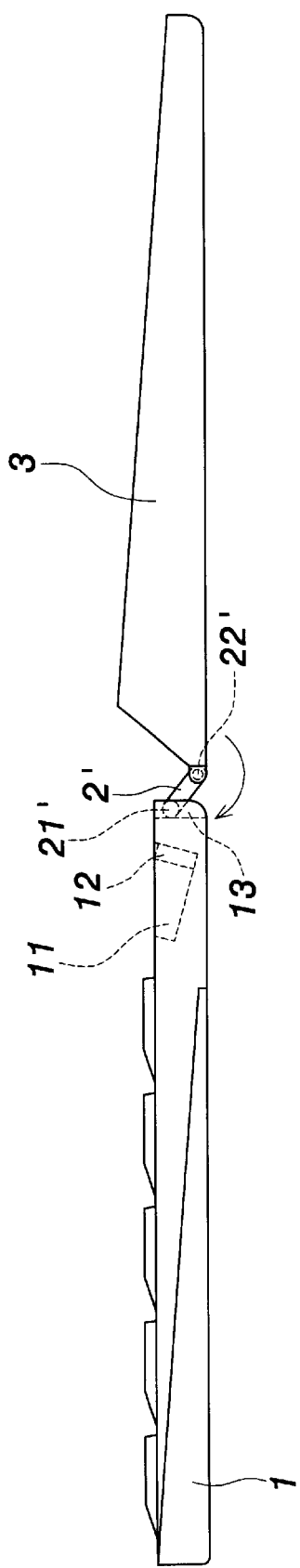
FIG. 9 shows the sectional view of the protective lid of another preferred embodiment of the invention in an unfolded state.

The lid 3 is opened with the two front pivotal shafts 21' and the two pivotal holes 14, and with the two rear pivotal shafts 22' and the retaining holes 32. Therefore, the lid 3 is swung from closed state to unfolded state placed below the keyboard body 1, as shown in FIG. 9 and FIG. 10. The lid 3 can be used as keyboard mounting and the keyboard body I is inclined to an angle for comfortable operation.

To sum up, the invention a keyboard having a protective lid has the functions of dust-proofing, protection, supporting and keyboard mounting, and the keyboard body is inclined to a comfortable position for operation.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications intended to be embraced within the scope of the invention as defined in the appended claims.

I claim:

1. A keyboard, comprising:

a keyboard body having a front side and a rear side, and a top surface and a bottom surface;

a linkage board having a front side and a rear side, the front side of the linkage board being pivotally connected to the rear side of the keyboard body; and a lid having a front side, a rear side and two lateral sides, and a top surface and a bottom surface, the front side of the lid being pivotally connected to the rear side of the linkage board, the lid further having tapered walls formed at each respective lateral side, the tapered walls being on the top surface of the lid, whereby when the lid is at a first position, the tapered walls sit on the top surface of the keyboard body so that the lid covers the keyboard body, and when the lid is pivoted to a second position, the keyboard body sits on the bottom surface of the lid with the tapered walls raising the rear side of the keyboard body higher than the front side of the keyboard body.

2. The keyboard as claimed in claim 1, wherein the keyboard body includes a receiving space on the top surface of the rear side thereof, and a socket in the receiving space, which connects to an internal circuit of the keyboard body for accommodating a portable electronic device.

3. The keyboard as claimed in claim 2, wherein the portable electronic device is a PDA (Personal digital assistant) or a mobile phone.

4. The keyboard as claimed in claim 1, wherein the keyboard body includes an accommodation space on the rear side thereof for accommodating the linkage board.

5. The keyboard as claimed in claim 4, wherein the accommodation space has two lateral sides and a pivotal hole arranged on a center portion of each lateral side so that the linkage board is mounted to the pivotal holes and pivotally connected to the keyboard body.

6. The keyboard as claimed in claim 5, wherein the linkage board includes two pivotal shafts on the front side thereof and being insertable into the respective pivotal holes of the accommodation space so that the linkage board is pivotally connected to the keyboard body.

7. The keyboard as claimed in claim 4, wherein the accommodation space has two lateral sides and a pivotal hole arranged on a bottom portion of each lateral side so that the linkage board is mounted to the pivotal holes and pivotally connected to the keyboard body.

8. The keyboard as claimed in claim 7, wherein the linkage board includes two pivotal shafts on the front side thereof which are insertable into the respective pivotal holes of the accommodation space so that the linkage board is pivotally connected to the keyboard body.

9. The keyboard as claimed in claim 1, wherein the linkage board includes two pivotal shafts on the rear side thereof and being connected to the front side of the lid so that the lid is pivotally connected to the linkage board.

10. The keyboard as claimed in claim 9, wherein the lid includes two retaining posts on the front side thereof and a retaining hole formed in each retaining post so that the pivotal shafts of the linkage board are insertable into the respective retaining holes and the lid is pivotally connected to the linkage board.

* * * * *